United States Patent [19]

Ruckle et al.

[11] 3,713,207
[45] Jan. 30, 1973

[54] METHOD FOR DIFFUSION BONDING UTILIZING SUPERPLASTIC INTERLAYER

[75] Inventors: Duane L. Ruckle, Enfield; Robert A. Sprague, Kensington, both of Conn.

[73] Assignee: United Aircraft Corp., East Hartford, Conn.

[22] Filed: Dec. 28, 1970

[21] Appl. No.: 102,133

[52] U.S. Cl. ..........................29/498, 29/487, 29/504
[51] Int. Cl. ..........................B23k 31/02, B23k 35/24
[58] Field of Search..................29/498, 504, DIG. 45

[56] References Cited

UNITED STATES PATENTS

| | | | |
|---|---|---|---|
| 3,025,592 | 3/1962 | Fischer et al. | 29/504 X |
| 3,197,858 | 8/1965 | Fedusko et al. | 29/498 X |
| 3,478,416 | 11/1969 | Hamilton | 29/504 X |
| 3,530,568 | 9/1970 | Owczarski et al. | 29/498 |

OTHER PUBLICATIONS

Hayden, H. W. et al. "Superplastic Metals", Scientific American March 1969, pp. 28–35.

Underwood, Ervin E., "A Review of Superplasticity", Journal of Metals, Dec., 1962, pp. 914–919.

Garrett et al., Broad Applications of Diffusion Bonding, NASA CR-409, 3/25/66, pp. 19–26, 31–40, 44, 117 and 118.

King et al., "Diffusion Welding of Commercially Pure Titanium," Welding Journal, July 1967, pp. 289-S to 298-S.

King et al., "Additional Studies on the Diffusion Welding of Titanium, " Welding Journal, Oct., 1968 pp. 444-S to 450-S.

Perun, K. R., "Diffusion Welding and Brazing of Titanium 6AL–4V, Process Development," Welding Journal, Sept., 1967, pp. 385-S to 390-S.

Primary Examiner—J. Spencer Overholser
Assistant Examiner—Ronald J. Shore
Attorney—Richard N. James

[57] ABSTRACT

Articles are formed by diffusion bonding techniques wherein a foil of superplastic material is sandwiched between the surfaces to be joined.

4 Claims, No Drawings

METHOD FOR DIFFUSION BONDING UTILIZING SUPERPLASTIC INTERLAYER

BACKGROUND OF THE INVENTION

The present invention relates in general to diffusion bonding processes.

Diffusion bonding is well known in the art as evidenced for example by the U.S. Pat. to Owczarski et al. No. 3,530,568. Typically it contemplates the joining of metals below their melting point and it is often selected as the joining technique, in preference to fusion welding or brazing methods, because of excellent reproducability and, more importantly, because it permits greater material homogeneity across the joint interface. In fact, in properly made diffusion bonds the joint interface is practically indistinguishable from the adjoi substrate materials even on microscopic metallurgical examination.

Unfortunately, conventional diffusion bonding processes typically require the use of high temperatures and pressures for the attainment of satisfactory bonding. While in some circumstances such high pressures and temperatures are tolerable, in many they are not. Many advanced gas turbine engine components, for example, incorporate internal cooling passages with corresponding thin web sections for a maximum heat transfer or hollow sections to increase stiffness and decrease weight. Such components cannot be exposed to very high bonding pressures because of the danger of structural deformation or collapse. And yet these components may desirably be made by assembly of a plurality of subcomponents or details.

Then, too, in the manufacture of filament strengthened metallic tapes or hardware wherein a plurality of oriented filaments are laid up in and provide support and perhaps other characteristics such as high modulus of elasticity (stiffness) to the hardware, the filaments are often prone to breakage and filament/matrix interactions at the high temperatures and pressures required for diffusion bonding as conventionally practiced.

In addition, whether or not the details to be diffusion bonded are susceptible to structural damage as a result of high pressures and temperatures in the fabrication sequence, very careful machining of the surfaces to be joined is required to provide a precise, cooperative match therebetween, for otherwise the joint formed by diffusion bonding will be discontinuous. This is particularly necessary when the materials themselves are particularly resistant to deformation by their very nature, as obviously required in many circumstances as, for example, in gas turbine engine hardware. When the surfaces to be joined are flat, suitable polishing may be sufficient. However, when the surfaces are themselves discontinuous or contoured three-dimensionally, the magnitude of the machining problem will be readily recognized. This preciseness of dimension is quite obviously not required in processes such as brazing wherein the flow of the braze or other like material compensates within reasonable bounds for a mismatch or irregularities in the abutting surfaces.

SUMMARY OF THE INVENTION

Briefly stated, the present invention contemplates a diffusion bonding process wherein a sheet of material characterized zed a condition of superplasticity at the bonding temperature is sandwiched between the surfaces to be diffusion bonded; the surfaces are pressed together under conditions causing the superplastic material to flow and fill the voids between the surfaces and form a diffusion bond therebetween.

If the temperature of application for the structure is below that when the condition of superplasticity is present at the joint, no further processing may be required. In other cases the composite may be heat treated to eliminate the material of its condition of superplasticity thereby providing a high strength unitary article.

DESCRIPTION OF THE PREFERRED EMBODIMENT

As used herein, the term superplasticity is utilized to define the ability of certain materials to undergo abnormally large, uniform deformations without rupture. A discussion of this phenomenon has been reported in an article by D. H. Avery et al in the Transactions of the ASM, Vol. 53, (1965). Such a condition of superplasticity may exist in some materials solely as a function of their chemistry. If, in such materials, the condition, after completion of the bonding process, exists only at temperatures above the operating regime of the bonded assembly whether because of the basic formulation itself or because of chemistry or metallurgical alterations occurring during bonding, such materials are usable in the present invention.

Also usable are those materials, including the age-hardenable alloys normally resistant to deformation, which may be placed in a temporary condition of superplasticity. In these materials, the propensity for large elongations may be eliminated by subsequent processing such as appropriate heat treatment. In the Pat. to Moore et al 3,519,503, of common assignee with the present invention, there is described suitable processing wherein the difficult to forge alloys are processed in compression under controlled conditions of temperature and reduction to provide a temporary condition of high plasticity in such alloys.

A copending application of Athey et al., Ser. No. of even filing date with the present application and sharing a common assignee, there is described a method for forming composite articles, such as gas turbine engine hardware wherein a matrix alloy in a temporary condition of superplasticity is pressed around a supporting material which may be retained therein for strengthening or other purposes or may be leached therefrom to form hollow hardware.

Reference to the foregoing reveals that among the materials contemplated for use in the present process are the age-hardenable alloys including the alpha-beta titanium alloys containing, by weight, 6 percent aluminum, 4 percent molybdenum, balance titanium; and 8 percent aluminum, 1 percent molybdenum, 1 percent vanadium, balance titanium. Titanium alloys to the above compositions worked in compression by rolling at 1,700°F. at strain rates of 0.02–0.50 in./in./min. (Ti-6-4) and 0.67 in./in./min. (Ti-8-1-1) are capable of elongations of up to 400 percent. Also suitable are the titanium alloys containing, by weight, 6 percent aluminum, 2 percent tin, 4 percent zirconium, 2–6 percent molybdenum, balance titanium; and 6 percent aluminum, 6 percent vanadium, 2 percent tin, balance titanium and, in general, the other titanium alloys such as the stable alpha and metastable-beta alloys at an average grain size of about one micron.

In the present process as in the case of most diffusion bonding processes, it is essential to provide clean surfaces at the interface where bonding is to take place. In particular, the joint interface during processing must be free of contaminating species which interfere with the bonding process or lead to heterogeneity at the joint area. Usually, bonding is undertaken in vacuum or under inert gas cover to maintain the maximum cleanliness for bonding. It is a fact, however, that many useful materials provided in a high state of cleanliness will nevertheless accumulate undesirable quantities of contaminants, particularly oxides, under the vacuum or inert gas conditions typically utilized in these processes. Fortunately, the titanium oxides are soluble at the bonding conditions contemplated herein and, therefore, unless they are present in gross amounts they do not appear to provide undue interference with the desired joint formation. With other materials, such as the nickel base alloys, the oxides are insoluble and frequently resort to the use of bond promoters, as described in the U.S. Pat. to Owczarski et al., No. 3,530,568, is necessary.

In the present process, the surfaces to be diffusion bonded are positioned in abutment with a sheet of material in a condition of superplasticity sandwiched therebetween. The maximum thickness of the sheet is not particularly critical but the minimum thickness thereof must be sufficient to permit the voids therebetween to be filled. One of the major advantages of the present process is the ability to form homogeneous diffusion bonded joints at reduced pressures. Normally, therefore, the level of pressure applied will be sufficient to fill the voids between the surfaces, but less than that causing potential damage to the components being bonded and, typically, less than that required in normal diffusion bonding processes. With small components formed from the titanium alloys, the formation of satisfactory composites may readily be performed in small laboratory presses of 2 – 3 tons capacity.

In terms of temperature limitations in the pressing operation, normally a temperature level is selected whereat the condition of superplasticity is maintained until flow is substantially complete and the voids are filled. Preferably, also, the temperature at pressing is such that diffusion bonding is concurrently effected. It will be recognized, however, that pressing and heat treatment for diffusion bonding may be sequentially performed in suitable instances.

In some cases it may be desirable to apply a final heat treatment for strengthening and to rid the composite of all vestiges of superplasticity. This will depend to some extent upon the conditions to which the composite has been exposed in the fabrication sequence and the conditions of operation of the bonded structure in its intended use. If the operating temperature of the structure is below that temperature at which the fine grain size and the resulting condition of superplasticity have no significant effect on properties; it is not necessary to heat treat the bonded component to eliminate the property of superplasticity in the sheet or foil interface.

If the fine grain size of the sheet or foil do adversely effect the component properties at the intended range of temperature of operation, the component can be heat treated at conditions sufficient to cause grain growth across the interfacial layer and thereby remove the condition of superplasticity.

In the case of Ti-6-4 alloy provided in a temporary condition of superplasticity as herein previously discussed, grain growth is effected by the following heat treatment:

1,750°F., 1 Hr, air cool + 1,300°F., 2 Hrs, air cool.

Although the invention has been described in connection with certain preferred embodiments, it will be understood that it is not limited to the exact details described for obvious modifications will occur to those skilled in the art.

What is claimed is:

1. The method of diffusion bonding which comprises:
providing an alloy compatible with the metallic materials to be joined and characterized by a condition of superplasticity at the diffusion bonding temperature;
sandwiching the alloy between the surfaces to be joined by diffusion bonding;
pressing the two surfaces together with sufficient force to cause flow of the alloy in its superplastic filling the voids therebetween and diffusion bonding the surfaces together forming a unitary article, subsequently heat treating the joint interface to eliminate any residual condition of superplasticity at the anticipated operating temperature of the unitary article.

2. The method according to claim 1 wherein:
the materials being joined are titanium alloys.

3. The method according to claim 2 wherein:
the alloy sandwiched between the surfaces to be joined is a two-phase titanium alloy characterized by a grain size not exceeding about 1 micron.

4. The method according to claim 1 wherein:
the heat treatment sequence of the diffusion bonding process is selected to provide grain growth in the alloy at the joint interface.

* * * * *

PO-1050
(5/69)

UNITED STATES PATENT OFFICE
CERTIFICATE OF CORRECTION

Patent No. 3,713,207      Dated January 30, 1973

Inventor(s) Duane L. Ruckle, Robert A. Sprague

It is certified that error appears in the above-identified patent and that said Letters Patent are hereby corrected as shown below:

| | |
|---|---|
| Col. 1, line 17 | "adjoi" should read -- adjoining -- |
| Col. 2, line 44 | after "Serial No." insert -- 101,742 -- |
| Col. 2, line 46 | after "assignee," insert -- now U. S. Patent No. 3,711,936 -- |
| Col. 2, line 68 | "zed" should read -- by -- |
| Col. 4, claim 1, line 36 | after "superplastic" should appear the word -- condition -- |

Signed and sealed this 3rd day of July 1973.

(SEAL)
Attest:

EDWARD M. FLETCHER, JR.
Attesting Officer

Rene Tegtmeyer
Acting Commissioner of Patents